United States Patent [19]

Rendina

[11] Patent Number: 5,445,099
[45] Date of Patent: Aug. 29, 1995

[54] HYDROGEN HYDRIDE KEEL

[76] Inventor: David D. Rendina, 1063 - Heritage Blvd., North Vancouver, B.C., Canada, V7J 3G2

[21] Appl. No.: 124,692

[22] Filed: Sep. 20, 1993

[51] Int. Cl.⁶ ............................................. B63B 3/38
[52] U.S. Cl. .................................. 114/140; 165/104.12
[58] Field of Search ............... 114/140, 127, 270, 121; 165/104.12

[56] References Cited

U.S. PATENT DOCUMENTS

| | | | |
|---|---|---|---|
| 4,335,093 | 6/1982 | Salomon | 423/644 |
| 4,360,350 | 11/1982 | Grover | 114/140 |
| 4,402,187 | 9/1983 | Golben et al. | 62/48 |
| 4,422,500 | 12/1983 | Nishizaki et al. | 165/104.12 |
| 4,505,120 | 3/1985 | Golben et al. | 62/48 |
| 4,964,524 | 10/1990 | Halene | 220/3 |
| 5,082,048 | 1/1992 | Iwaki | 165/1 |

FOREIGN PATENT DOCUMENTS

| | | | |
|---|---|---|---|
| 0171692 | 8/1986 | Japan | 114/140 |
| 2020294 | 11/1979 | United Kingdom | 114/121 |

*Primary Examiner*—Sherman Basinger

[57] ABSTRACT

A fixed ballast containment unit connected with a ship, comprised of an outer keel shell (16) within which a number of metal hydride containers (18) are supported by internal braces (17) in a manner which provides passages around the metal hydride containers (18) through which a number of heat intermediums may be induced to flow, so that the reactive properties of hydrogen with metal hydrides can be applied to various ships systems, while the mass of the ballast containment unit provides an inertial force to counteract external forces acting on the ship.

17 Claims, 18 Drawing Sheets

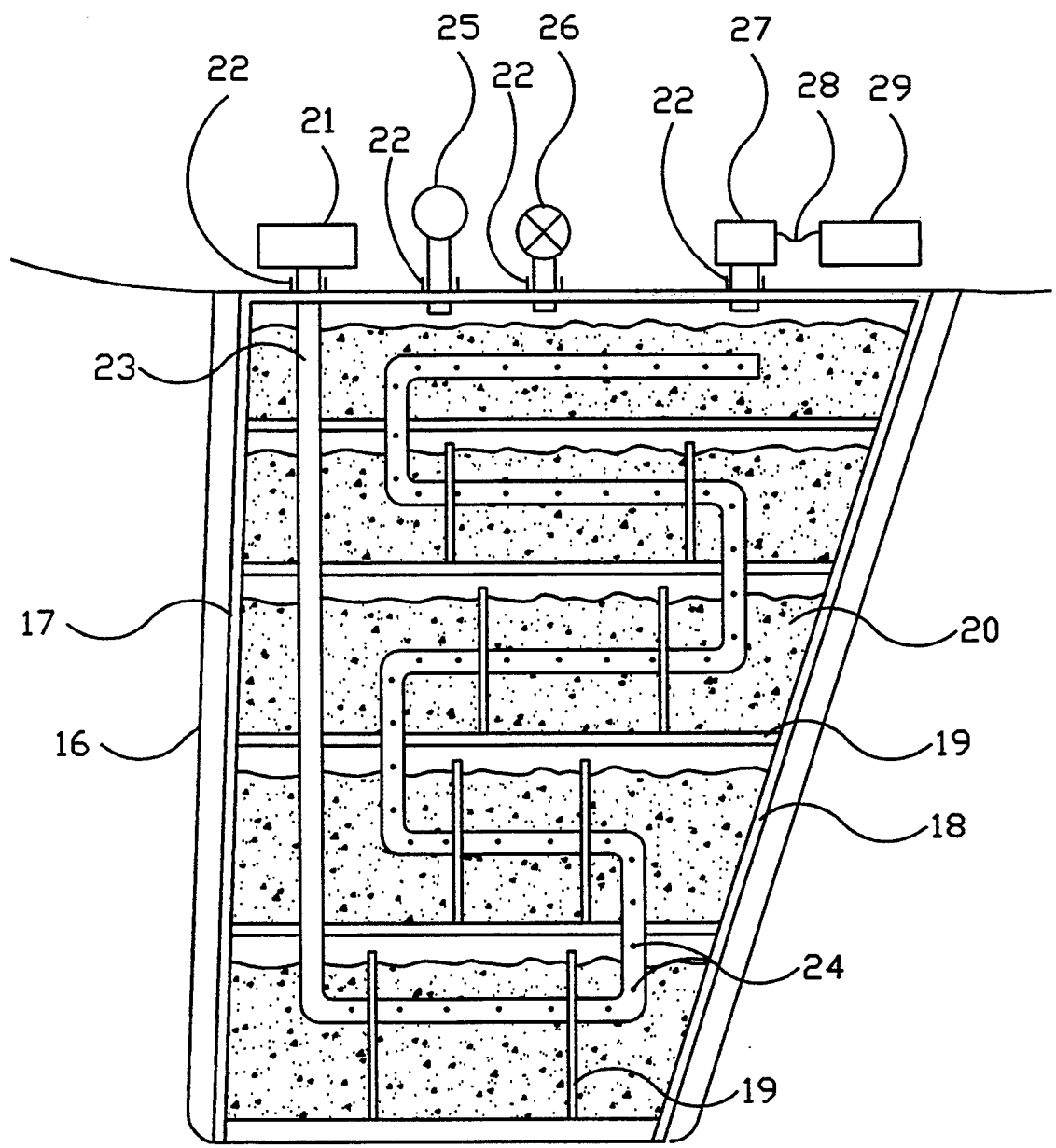

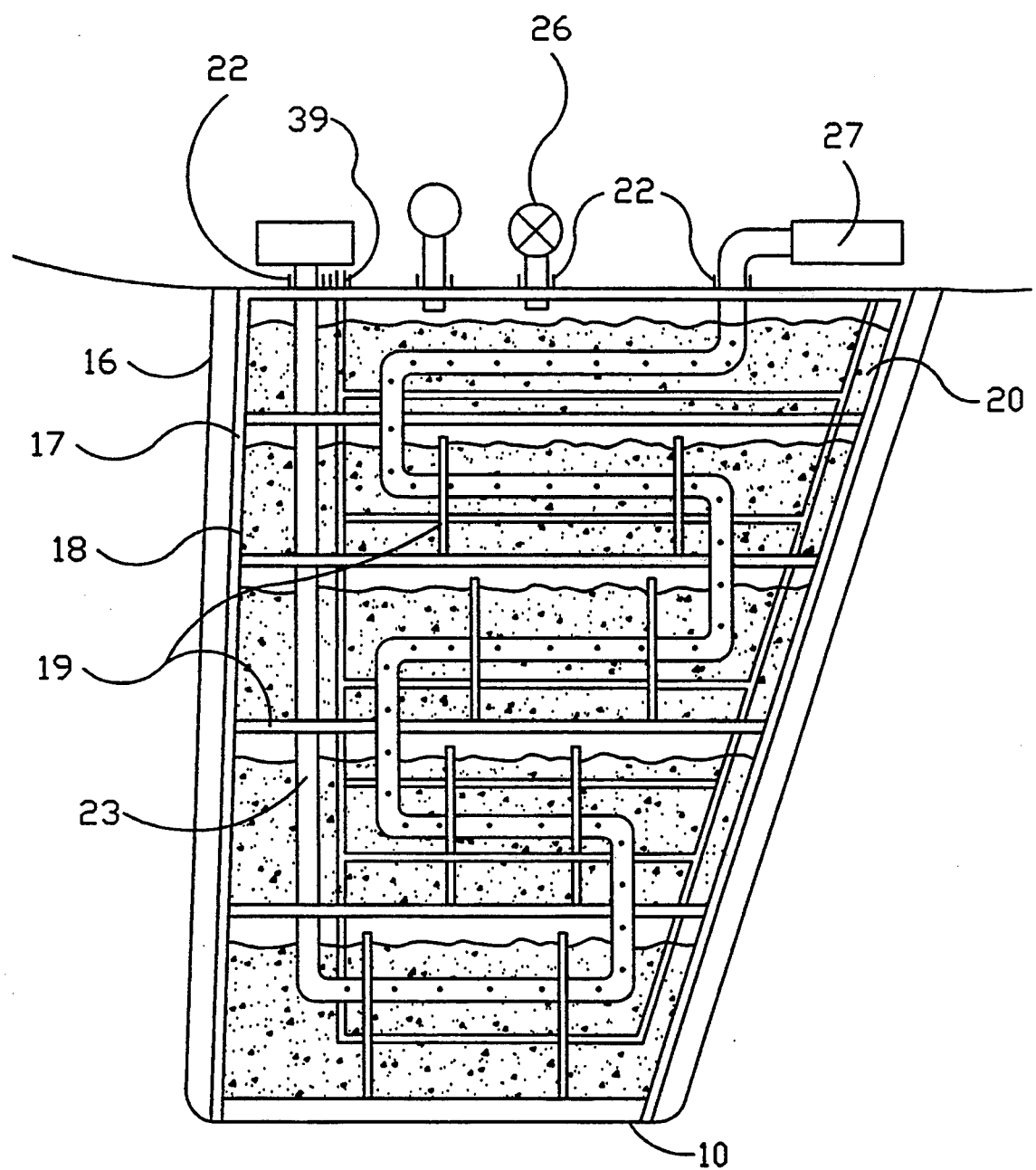

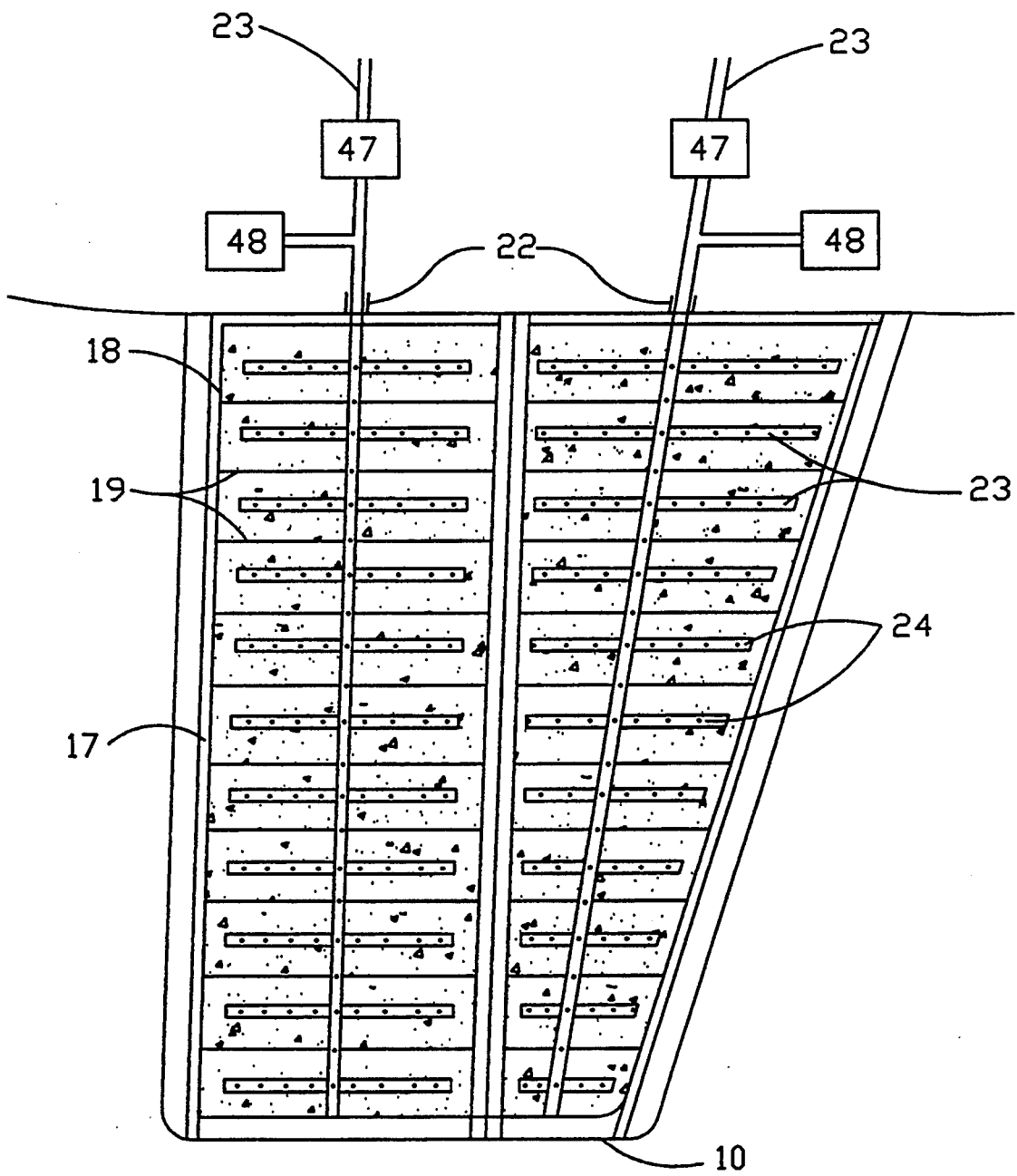

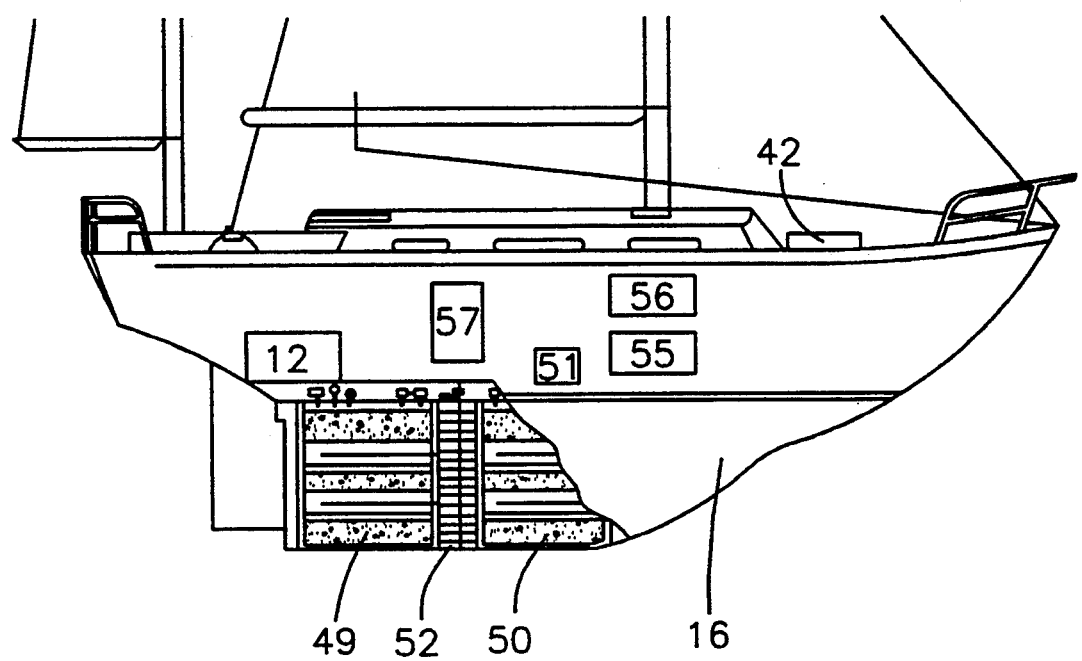

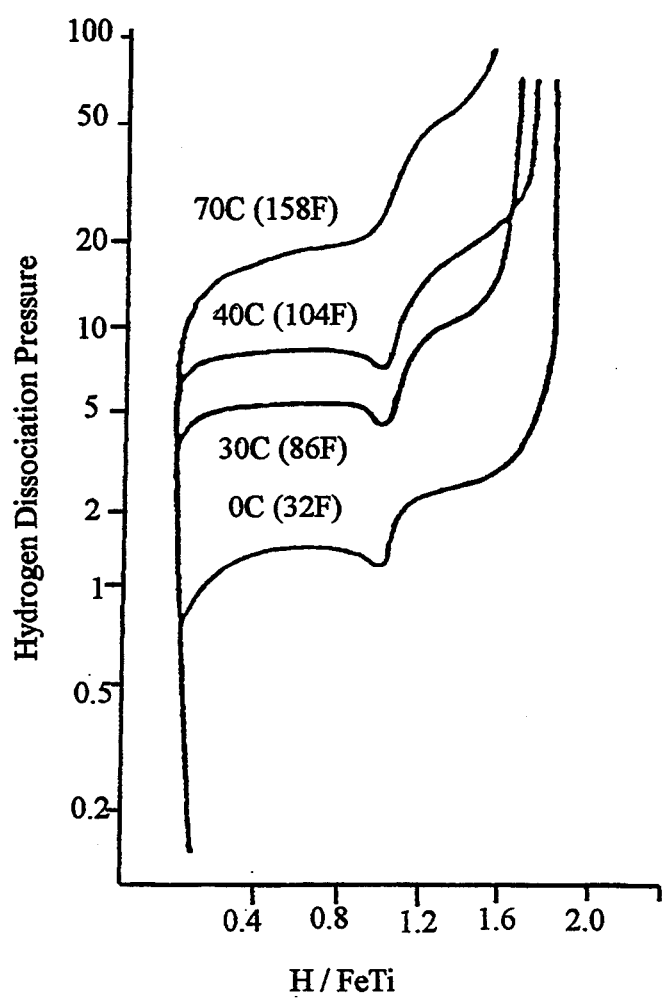

FIG. 11

| Hydride | Volume | | Weight | | H₂ Stored | |
|---|---|---|---|---|---|---|
| | (cm³) | (in³) | (kg) | (lb) | (kg) | (lb) |
| VOLUME HELD CONSTANT | | | | | | |
| IRON TITANIUM | 39,329 | 2,400 | 76.5 | 347 | 1.5 | 6.9 |
| MAGNESIUM NI. | 39,329 | 2,400 | 38.4 | 174 | 1.5 | 6.9 |
| MAGNESIUM | 39,329 | 2,400 | 38.4 | 174 | 3.0 | 13.8 |
| WEIGHT HELD CONSTANT | | | | | | |
| IRON TITANIUM | 39,329 | 2,400 | 76.5 | 347 | 1.5 | 6.9 |
| MAGNESIUM NI. | 78,658 | 4,800 | 76.5 | 347 | 3.0 | 13.8 |
| MAGNESIUM | 78,658 | 4,800 | 76.5 | 347 | 6.1 | 27.8 |

HYDROGEN HYDRIDE KEEL

FIELD OF THE INVENTION

This invention relates to ships keels, skegs or other fixed ballast containers for ships requiring fixed ballast to enhance their stability, such as full displacement and semi-displacement ships. Specifically the invention relates to a fixed ballast mechanism, which functions as a means to enhance a ships stability, store hydrogen, compress hydrogen gas, provide heat exchange, transfer heat, pump heat, and store heat.

BACKGROUND OF THE INVENTION

The ballast material used within keels, skegs or other fixed ballast containers, and the ballast containers themselves, have hitherto been single purpose mechanisms, their function being to provide stability.

The choice of ballast material used has been based primarily on three variables; the volume to weight ratio of the material, the availability of the ballast material, and the cost of the material.

The use of lead, iron, cement and other weighty material as ballast for ships requiring fixed ballast to enhance stability has been common for serval years.

The inventor has found that certain alloys, specifically ferrous titanium and other metal hydrides provide a suitable alternative ballast material, based on the volume to weight ratio required for numerous ship designs.

It is also known that a certain kind of metal or alloy exothermically occludes hydrogen to form a metal hydride, and the metal hydride endothermically releases hydrogen in a reversible manner.

Many such metal hydrides have been known and examples include lanthanum nickel hydride (LaNi5H[x]), calcium nickel hydride (CaNi5H[H]), misch metal nickel hydride (M[m]Ni5H[x]), iron titanium hydride (FeTiH[x]), and magnesium nickel hydride (Mg2NiH[x]).

Further it has been shown that different metal hydrides possess different absorption/desorption qualities.(Source: R. L. Cohen, "Intermatallics for Hydrogen Storage", Science. Dec. 1981, p.1082). For example it has been found that at atmospheric pressure, magnesium hydride holds more hydrogen per unit weight than ferrous titanium hydride but must be heated to higher temperatures, 204 degrees C., as opposed to 20 degrees C., to release its stored hydrogen.

It has also been shown that the different absorption/desorption, exothermal/endothermal properties of various metal hydrides may be employed, to store and release hydrogen fuel, to provide heat exchange, and to compress gases.

U.S. Pat. No. 5,082,048 to Iwaki et al.(1991) discloses a hydrogen fuel storage tank for the hydrogen engine system of a forklift.

U.S. Pat. No. 4,402,187 to Golben (1982) discloses a hydrogen compressor.

U.S. Pat. No. 4,422,500 to Nishizaki (1981) discloses a metal hydride heat pump.

All of the above mechanisms which employ the exothermal/endothermal and/or the differences in absorption/desorption properties of metal hydrides to perform the tasks stated, are designed to minimize the amount of metal hydride necessary to accomplish those tasks so that they may decrease the weight of the units employed.

This practise generally results in the use of costly and/or realitively less stable alloys and of expensive manufacturing processes.

Further, the minimizing of weight works at cross purposes to the primary function of the present invention i.e. to enhance the stability of a ship by providing a massive inertial counter-force to external forces acting on the ship.

The inventor has found that by employing the realativly large quantities of metal hydrides necessary to stabilize most ships, the stated tasks may be accomplished with more stable and less costly metal hydrides.

Further, the inventor has found that through the use of certain metal hydrides as ballast material, arranged in the ships fixed ballast container in a manner which sujects the ballast material to various heat sources, the fixed ballast container can perform its primary function as a means to stabilize a ship as well as numerous secondary functions.

OBJECTS AND ADVANTAGES

It is the object of the present invention to provide a multi-function keel, skeg or other fixed ballast container for ships requiring fixed ballast to enhance their stability or sea kindliness.

Another object of the present invention is to provide a means for storing hydrogen fuel for use in an internal combustion engine, boiler, gas turbine, or fuel cell.

Further object of the present invention is to provide an efficient means of heat exchange for ships systems which require a method of heat exchange for their efficient operation. These might include, but are not limited to; the ships internal combustion engines, fuel cell, hydraulic systems, water maker, electrical systems, heating/air conditioning systems, and refrigeration systems.

Another object of the present invention is to provide a means for compressing hydrogen gas for storage and combustion, and/or, through the use of a pressure exchange mechanism, for ships systems which require compressed gases for their operation. These might include, but are not limited to; the ships internal combustion engines, fuel cells, control systems, and refrigeration systems.

Further object of the present invention is to provide a means to store heat and withdraw heat stored within the ballast material in the keel.

Another object of the present invention is to provide a means of heat transference from a source remote from the keel to the ballast material within the keel, and to pump heat from one point within the keel to another point within the keel.

Further object of the present invention is to provide a means to eliminate the expansion stress of the metal hydride ballast material on the outer keel shell wall. Thereby allowing the outer keel shell to be manufactured from materials which are not necessarily chosen on the basis of their resistance to expansion stress.

Another object of the present invention is to provide a metal hydride ballast container and a method of heating and cooling the container which can minimize the expansion stress on the metal hydride container during the absorption/desorption of hydrogen gas.

Further object of the present invention is to provide a metal hydride ballast container which can prevent the uneven arrangement of ballast material, and prevent the lowering of the heat exchanging efficiency of the metal hydride.

Another object of the present invention is to provide a means of securing the ballast material within the keel to prevent shifting of the ballast material under sailing conditions.

BRIEF DESCRIPTION OF THE DRAWINGS

FIG. 4 is a side view of the hydrogen keel of the fourth embodiment with internal electical heat source, FIG. 5; is side view of the hydrogen keel of the fifth embodiment with extenal remote metal hydride container, FIG. 6; is a side view of the hydrogen keel of the sixth embodiment with dual external heat intermedium source, FIG. 7; is a side view of the heat storage hydrogen keel of the seventh embodiment, FIG. 8; is a side view of the hydrogen compressor/-hydrogen keel of the eight embodiment, FIG. 9; is a side view of a full keel vessel with associated heat sources and hydrogen keel, FIG. 9A; is a side view of the arrangement of ballast containers and associated heat intermedium passages of the hydrogen keel of the ninth embodiment.

Figure 1:
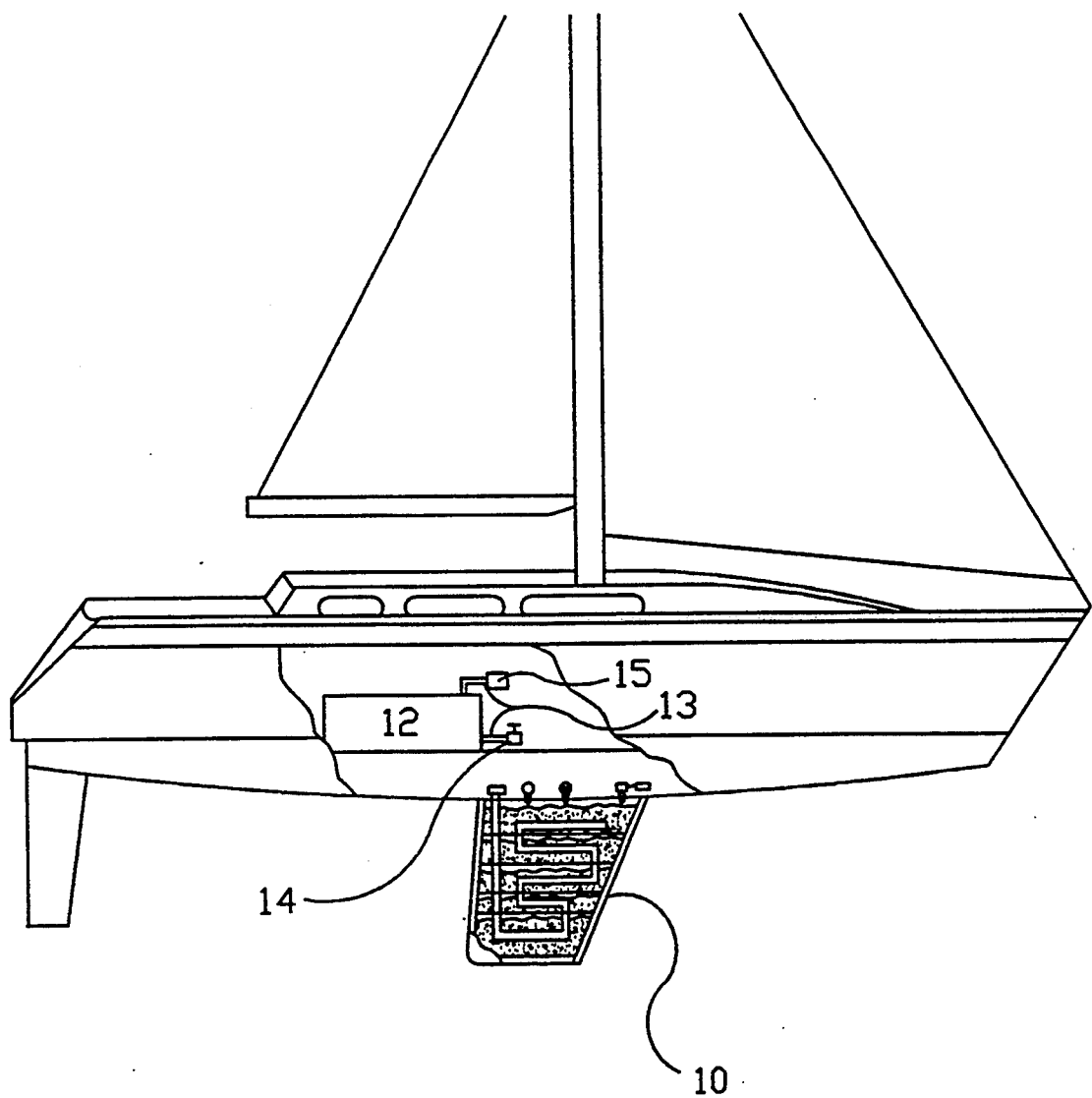
FIG. 1; is a partially broken side view of a hydrogen engine system and hydrogen keel of the first embodiment of the present invention on a fin keeled sailing vessel, FIG. 1A; is a side view showing the single pass fin keel of FIG.1 in detail, FIG. 1B; is a front view of an internal brace of the single pass fin keel of FIG. 1, FIG. 1C; is an exploded view of the internal ballast container and internal bracing of the hydrogen keel of FIG. 1, FIG. 2; is a side view of a hydrogen keel with internal heat intermedium flow of the second embodiment, FIG. 3; is a partially broken side view of a multi pass hydrogen keel semi-displacement vessel of the third embodiment of the present invention, FIG. 3A; is a front view of the forward internal brace of the multi-pass keel of the third embodiment, FIG. 3B; is a view of the rear internal brace of the multi-pass keel of the third embodiment.

| List of Terms |
| --- |
| 10. KEEL |
| 12. HEAT SOURCE |
| 13. COOLING WATER PIPE |
| 14. TEMPERATURE REGULATING VALVE |
| 15. PUMP |
| 16. KEEL SHELL |
| 17. INTERNAL BRACES |
| 18. METAL HYDRIDE BALLAST CONTAINER |
| 19. INTERNAL BAFFLE |
| 20. BALLAST MEDIUM |
| 21. GAS REGULATING VALVE |
| 22. GAS TIGHT FITTING |
| 23. GAS DISTRIBUTION MANIFOLD |
| 24. DRILLED PASSAGES |
| 25. PRESSURE GAUGE |
| 26. PRESSURE RELIEF VALVE |
| 27. GAS PRESSURE REGULATING VALVE |
| 28. FUEL LINE |
| 29. INLINE FILTER |

| -continued |
| --- |
| List of Terms |
| 30. "C" CHANNEL |
| 31. FLEXIBLE SEAL |
| 32. BOLTS |
| 33. CUT AWAY SPACES |
| 34. FLANGE |
| 35. FLANGE BOLTS |
| 36. MULTI-PASS BRACE "A" |
| 37. MULTI-PASS BRACE "B" |
| 38. PARTIAL DIRECTIONAL BAFFLES |
| 39. ELECTRICAL HEATING ELEMENT |
| 40. MATERIAL FILTER |
| 41. INSULATING MATERIAL |
| 42. REMOTE METAL HYDRIDE CONTAINERS |
| 43. SECOND METAL HYDRIDE |
| 44. KEEL CHAMBER "A" |
| 45. KEEL CHAMBER "B" |
| 46. BARRIER |
| 47. IN LINE ONE WAY VALVE |
| 48. ONE WAY DIVERTER VALVE |
| 49. FUEL CONTAINER "All |
| 50. FUEL CONTAINER "B" |
| 51. ELECTROLYZER |
| 52. COMPRESSOR "A" |
| 53. COMPRESSOR "B" |
| 54. HEAT STORAGE UNIT |
| 55. COOLING WATER PUMP |
| 56. HEATING WATER PUMP |
| 57. ACCUMULATOR TANK |
| 58. METAL HYDRIDE HEAT PUMP |

DESCRIPTION OF THE PREFERRED EMBODIMENTS

The First Embodiment

A hydrogen keel used to enhance a ships stability and hydrogen storage system of the first embodiment of the present invention is now described hereinafter referring to FIGS. 1, 1A, 1B, and 1C;

A hydrogen keel, skeg, ballast container 10 is connected with a hydrogen engine, fuel cell or other heat source 12 via a cooling water pipe 13 which is used for carrying a heat intermedium. Said heat intermedium may be returned to the heat source 12 or discharged.

A temperature switch 14 and a cooling water pump 15 are connected between the heat source 12 and the keel 10. The heat intermedium exits the keel 10 by means of cooling water return line 13 and the pump 15..

The temperature of the heat intermedium supplied by heat source 12 of the present embodiment is maintained, for example at 165 degrees F. by means of the temperature switch 4, which regulates the flow of the heat intermedium.

Figure 1B:
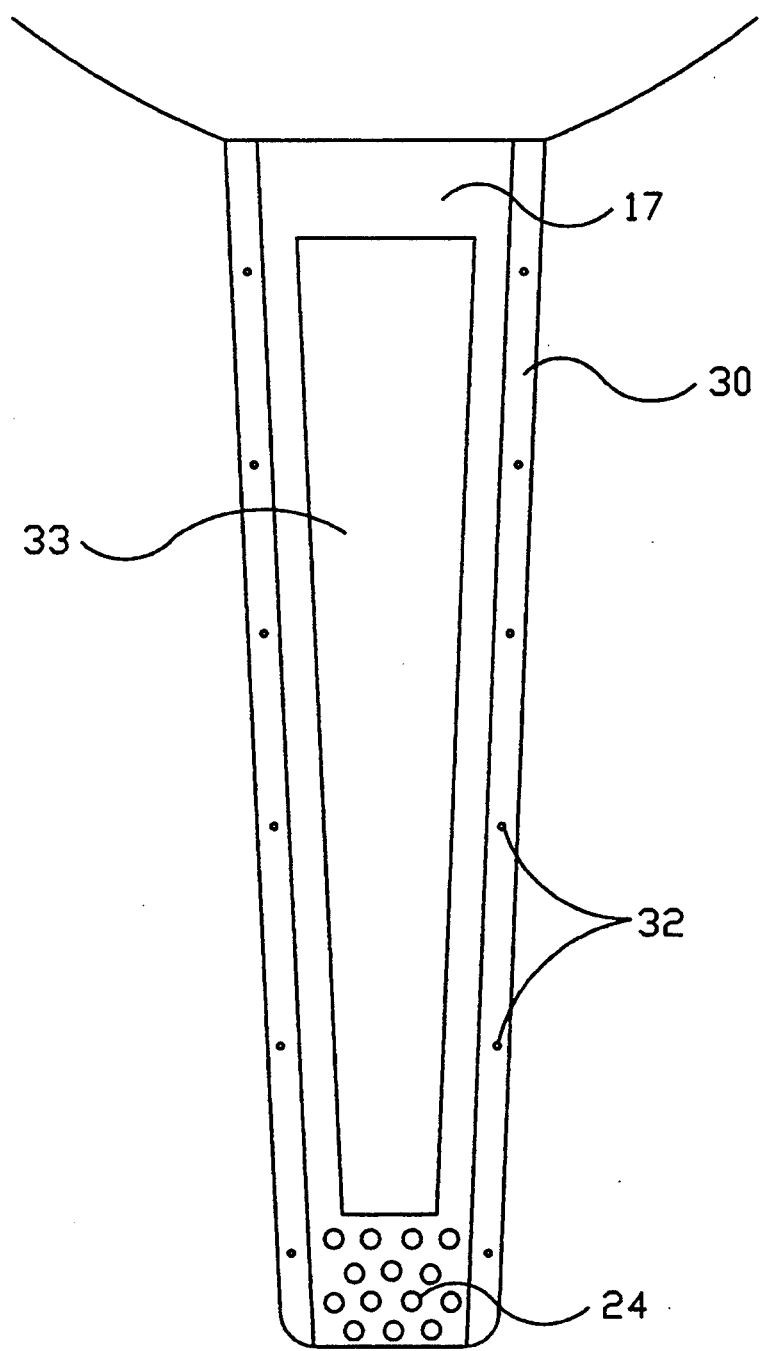
Figure 1C:
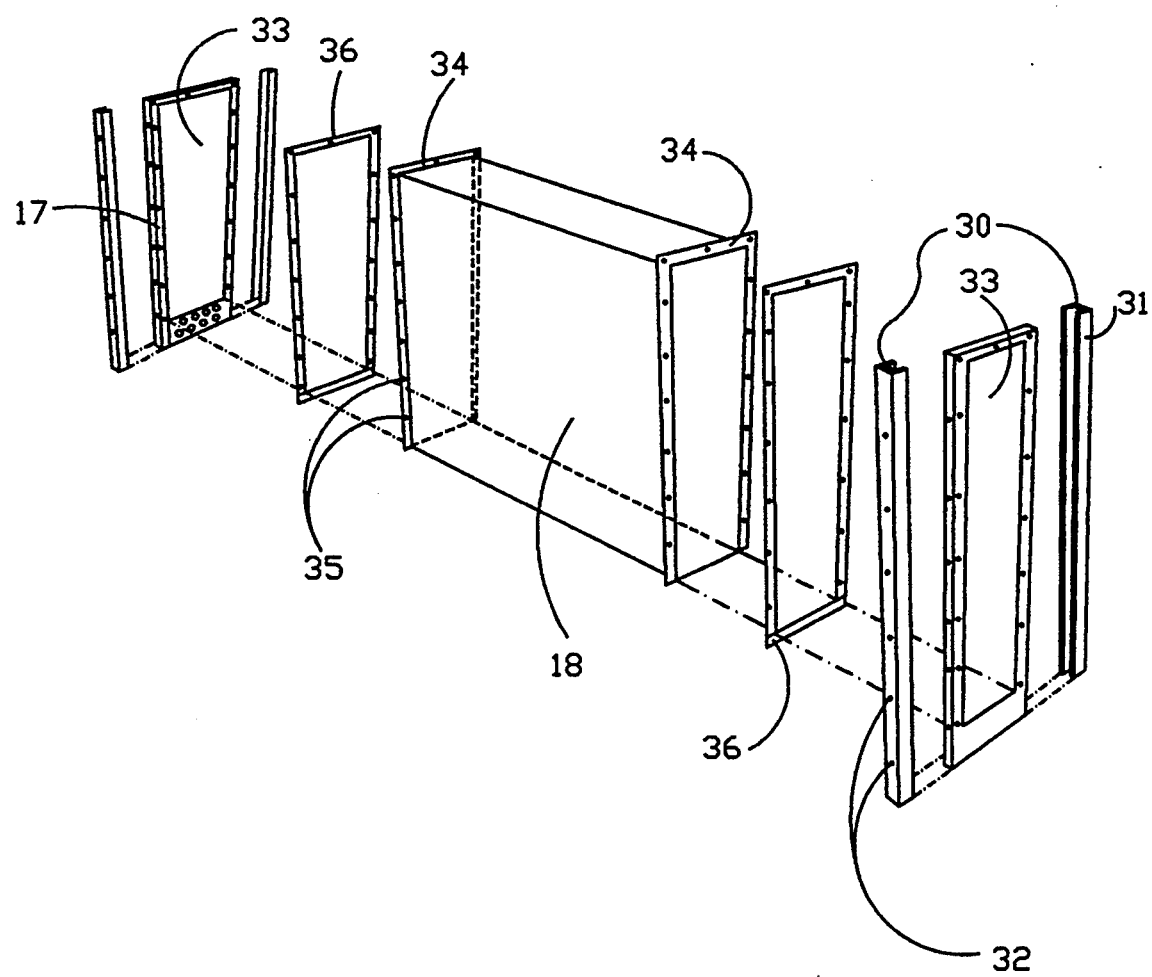

The hydrogen keel referred to in FIG.1 is shown in detail in FIGS. 1A, 1B, and 1C. The heat intermedium passes between the inner wall of the keel shell 16 and the internal bracing 17 and circulates around the metal hydride ballast container 18 (herinafter reffered to as ballast container 18)which contains a metal hydride ballast medium 20(herinafter reffered to as ballast medium 20) and hydrogen atmosphere.

A space is provided between the ballast container 18 and the keel shell 16 by internal bracing 17 to allow for expansion of the ballast container 18.

A pair of "c" cahnnels 30 are secured to the internal wall of the keel shell 16. A flexible seal 31 is applied to the interior of the "c" channel 30. Internal braces 17 are inserted between the pair of "c" channels 30 and secured by bolts 32.

The ballast container 18 is secured within the cut away spaces 33 in the internal braces 17 by flange 34 and bolts 35. A flexible seal 36 provides a seal between ballast container 18 and, internal braces 17.

Within the ballast container 18, in addition to the ballast medium 20 and hydrogen atmosphere, there are heat conducting, partial, horizontal and vertical baffles 19 which are used to conduct heat through the ballast medium 20, and secure the ballast medium 20 from shifting during sailing conditions.

A space between the ballast medium 20, and each horizontal baffle 19 is provided to allow expansion of the ballast medium 20 during hydrogen occlusion. A space is cutaway in each horizontal baffle 19 to allow for equalizing pressure of the supplied hydrogen gas throughout the ballast container 18.

A gas regulating valve 21 is connected through a gas tight fitting 22 to a gas distribution manifold 23. The gas distribution manifold 23 passes through each of the baffled compartments and distributes supplied hydrogen gas throughout the ballast medium 20 through drilled passages 24.

A pressure gauge 25 is connected through a gas tight fitting 22 to the ballast container 18 and to the space provided for expansion of the ballast medium 20 at the top of the ballast container 18, and is used to indicate the state of absorption/desorption of the hydrogen gas by the ballast medium 20.

A pressure relief valve 26 is connected through a gas tight fitting 22 to the ballast container 18 and to the space provided for expansion of the ballast medium 20 at the top of the ballast container 18 and is used to vent hydrogen gas in the event of over-pressuring the hydrogen keel 10.

A gas pressure regulating valve 27 is connected through a gas tight fitting 22 to the ballast container 18 and to the space provided for expansion of the ballast medium 20 at the top of the ballast container 18 and is used to regulate the flow of hydrogen gas as it exits the keel through fuel line 28.

A filter 29 is connected in line with fuel line 28 through a gas tight fitting 22, and is used to capture any entrained material or impurities within the hydrogen fuel.

The operation of the hydrogen keel to stabilize the ship and to store hydrogen is as follows;

The weight of the ballast material within the keel, stabilizes the ship in the conventional manner, i.e. the mass and form of the keel beneath the surface of the water acts as a counter to any forces which the ship is subject to above the water surface. Further, the inertial effect of the movement of the keel mass through the water resists forces which would tend to divert the ship from its established heading.

The hydrogen storage function of the keel is operated as follows;

During the hydrogen absorption phase the heat intermedium is cooled by the relatively colder sea water surrounding the keel, and in turn cools the ballast material, thereby enhancing its ability to form an occluded bond with supplied hydrogen gas.

During the desorption phase, the heat intermedium circulates around the ballast material, through passages provided by, and cut through, the internal braces. Thereby raising the temperature of the ballast material and facilitating the desorption of the stored hydrogen.

After transferring its heat to the ballast material and/or the water surrounding the keel, the heat intermedium is either returned to the heat source or discharged.

Internal braces, made from material resistant to expansion, such as stainless steel, are secured within "c" channels on the interior of the keel shell and provide transverse and/or longitudinal support. The internal braces are cut away at various points along their transverse and/or longitudinal surfaces to allow passage of the heat intermedium and, insertion and, support for the metal hydride containers.

The metal hydride containers, which can be formed into any shape or size required to fit within the keel shell, are inserted and secured within the cut away spaces of the internal braces.

A single or plurality of metal hydride containers may be employed.

A number of different metal hydride alloys may be employed within different containers in the same keel shell in order to take advantage of their different weight/volume, thermal/pressure, and hydrogen absorption/desorption properties.

A space is provided between the exterior wall of the metal hydride container and the inner wall of the keel shell to allow for expansion of the metal hydride containers.

Vertical and/or horizontal baffles, made from a material with good heat conductivity properties, separate the metal hydride container into several compartments.

Each compartment is partially filled with the metal hydride. A space is left unfilled in each compartment to allow for expansion of the metal hydride during absorption/desorption of hydrogen.

A gas distribution manifold passes through the compartments and distributes supplied hydrogen gas throughout the metal hydride.

A gas line is provided to draw off the released hydrogen gas from the metal hydride compartments.

The heat exchanges at the ballast container 18 are performed as described below;

Firstly the heat flow Qwm can be attained as below;

$$Q_{wm} = (T_w - T_m)/R_{wm}$$
$$= 2(T_{win} - T_w) Y_w C_w F_w \text{ (kcal/h)}$$

on conditions of $$T_w = (T_{win} + T_{wout})$$

where
- $T_w$ = Aveage temperature of the heat intermedium in the keel,
- $T_{win}$ = Temperature of the heat intermedium at the entrance of the keel,
- $T_{out}$ = Temperture of the the heat intermedium at an exit from the keel,
- $T_m$ = Average temperture of the metal hydride in the container,
- $R_{wm}$ = Heat resistance between the heat intermedium and the metal hydride,
- $Y_w$ = Specific weight of the heat intermedium,
- $C_w$ = Specific heat of the heat intermedium,
- $F_w$ = Quantity of flow of the heat intermedium circulating in the keel.

The hydride temperature Tm can be attained as below;

$$T_m = 1(Q_{wm} - Q_{mt} - Q_m)/C_m$$

$Qm = a(Fe)$ on contitions of
- $a$ = Quantity of heat of hydrogen dissaciation kcal/Nm,
- $Fe$ = Quantity of flow of the generated hydrogen,
- $Qmt$ = Quantity of heat lost at the heat intermedium keel shell inteface,
- $Cm$ = Heat capacity of the metal hydride.

Accordingly, when the metal hydride alloy comes to a heat equilibrium, a relationship $Qwm = Qm$ can be attained according to the (2) equation, and hydrogen is generated in the amount corresponding to the quantity of heat transferred from the heat intermedium.

Other objectives of the present invention will become apparent with an understanding of the embodiments discussed later, and the appended claims. Further, many advantages not mentioned in this specification will become obvious to one skilled in the art upon application of the present invention.

The Second Embodiment

Figure 2:
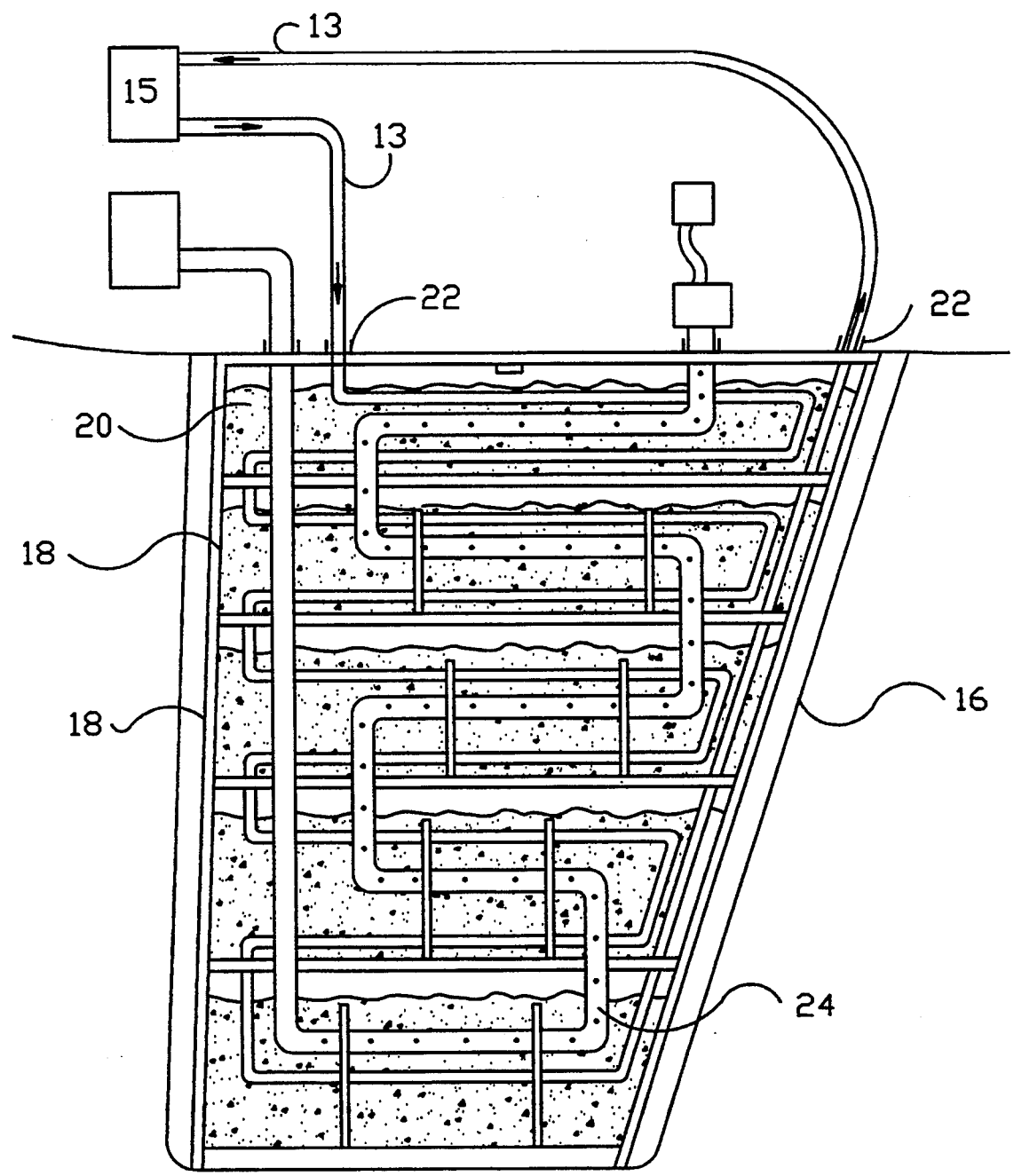

The hydrogen keel of the second embodiment of the present invention is described hereinafter in details referring to FIG.2;

As shown in FIG.2 the second embodiment of the present invention is the same in all respects to the first embodiment except a cooling water line 13 is connected through a gas tight fitting 22 to the ballast container 18. The cooling water line circulates a heat intermedium through each of the baffled compartments, exits through a gas tight fitting 22, and delivers the heat intermedium to the cooling water pump 15.

The present embodiment operates in the same manner as the first embodiment except a heat intermedium circulates within the ballast container, and a space is provided between the ballast container and the keel shell. Said space may be left empty to accommodate ballast expansion, or a second heat intermedium may be induced to flow through it.

The present embodiment provides a means for an internal heat intermedium and an external heat intermedium to react with the metal hydride ballast medium and hydrogen gas.

It further provides a means so that the upper portion of the ballast medium 20 in each baffled compartment receives heat or cooling first. Thereby controlling the expansion of the ballast medium 20.

The Third Embodiment

Figure 3:
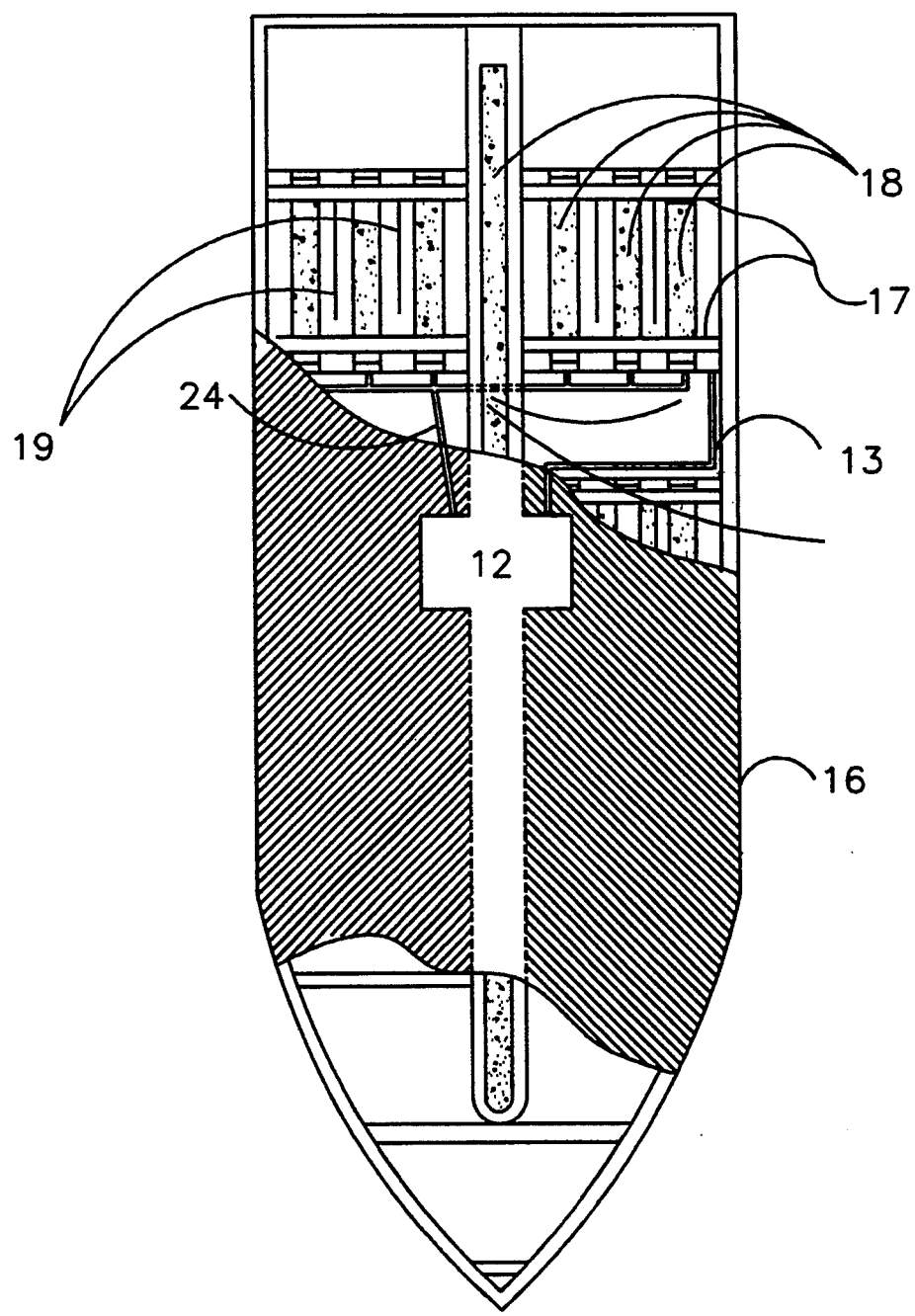
Figure 3A:
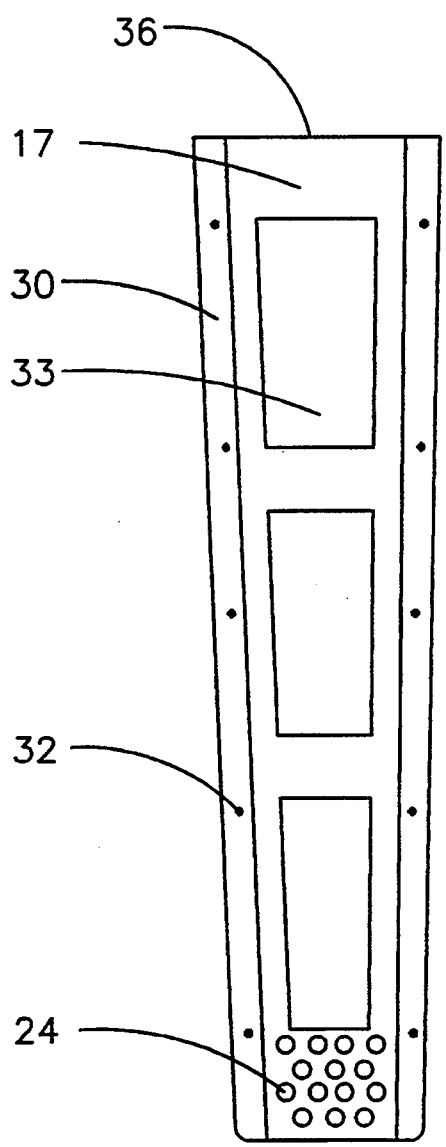
Figure 3B:
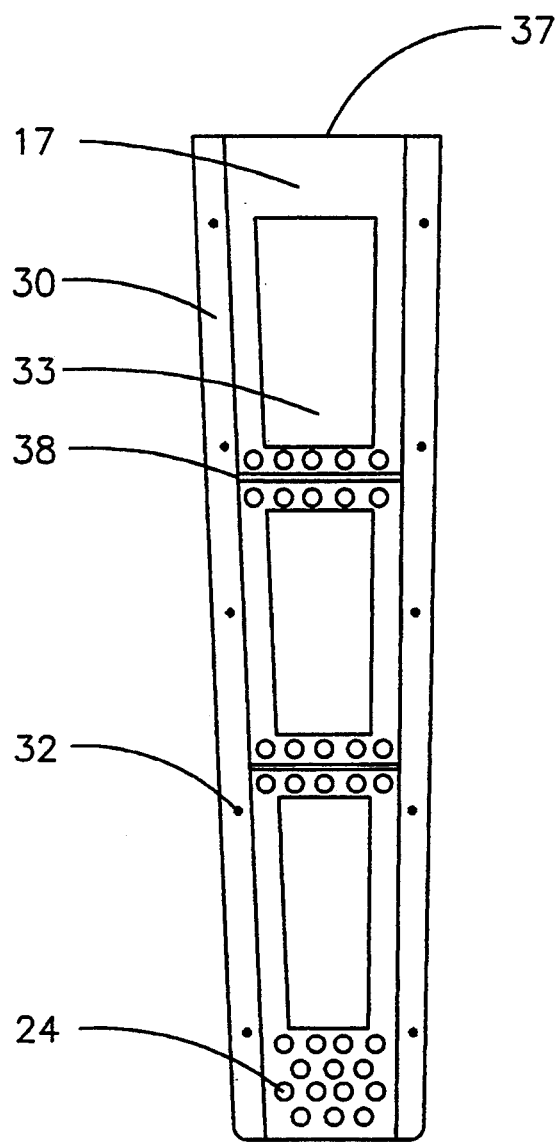

The third embodiment of the present invention is now described hereinafter referring to FIG.3;

As shown in FIG. 3, a hard chine, semi-displacement ship is depicted with several ballast containers 18 arranged, and supported within the keel shell 16 by internal braces 36 and 37.

The heat intermedium from heat source 12 is transfered to the keel 10 through cooling water line 13 and circulates around the metal hydride containers 18 through drilled passages 24 in the internal braces. Partial directional baffles 38 direct the flow of the heat intermedium around the metal hydride containers to return to cooling water line 13. All other features and operations are the same as FIG. 1.

The mass, shape, and location of the keel act to stabilize a ship in the conventional manner.

Further, the multi-pass flow of heat intermedium of present embodiment may be arranged in any keel form and allows a greater surface area of same weight of metal hydride to be exposed to an external heat intermedium. Thus enhancing the rate of heat transfer between the metal hydride ballast medium and the heat intermedium.

The Fourth Embodiment

The hydrogen keel of the fourth embodiment of the present invention is described hereinafter in details referring to FIG. 4;

The present embodiment employs the keel both to stabilize the ship and to store hydrogen.

As shown in FIG. 4, a hydrogen keel comprised of an outer keel shell 16 within which ballast container 18 is supported by internal braces 17.

Ballast container 18 is divided into compartments by internal baffles 19 and contains a metal hydride ballast medium 20. An electrical heating element 39 passes through each baffled compartment, and is connected through a gas tight fitting 22 to an external source of electrical energy. A space is provided at the top of each baffled compartment to allow for expansion of the metal hydride ballast medium 20. A space is provided between the ballast container 18 and the keel shell by internal braces 17 to allow for the passage of a heat intermedium.

A gas distribution line 23 is connected to ballast container 18 through gas tight fitting 22 and valve 21 and passes through each of the baffled compartments distributing supplied hydrogen gas to the ballast medium 20 or receiving hydrogen gas released from the ballast medium 20. Gas line exits the keel through gas tight fitting 22 and regulating valve 27. A pressure relief valve 26 is provided to prevent an over pressuring of the ballast container.

The operation of the fourth embodiment of the present invention is as follows;

The mass, shape, and location of the keel act to stabilize a ship in the conventional manner.

Further, to store supplied hydrogen, regulating valve 27 is closed, a heat intermedium at temperature $T[L]$ such as water or atmospheric air is induced to flow through the space provided by internal braces 17 and keel shell 16. Thus cooling ballast medium 20 and causing it to occlude hydrogen gas supplied through gas line 23.

To release stored hydrogen the flow of heat intermedium at temperature $T[L]$ is stopped, and gas supply is stopped by valve 21. Valve 27 is opened. An electrical current is supplied to heating element 39. Thus transferring heat to ballast medium 20 and causing it to release occluded hydrogen. Released hydrogen gas enters gas line 23 and exits the keel through regulating valve 27.

The present embodiment provides a means to increase or decrease the rate at which hydrogen is released by controlling the current, and thereby the heat, of electrical element 39.

The Fifth Embodiment

The hydrogen keel of the fifth embodiment of the present invention is described hereinafter in details referring to FIG. 5;

The present embodiment employs the keel both to stabilize the ship and as a heat pump.

Figure 5:
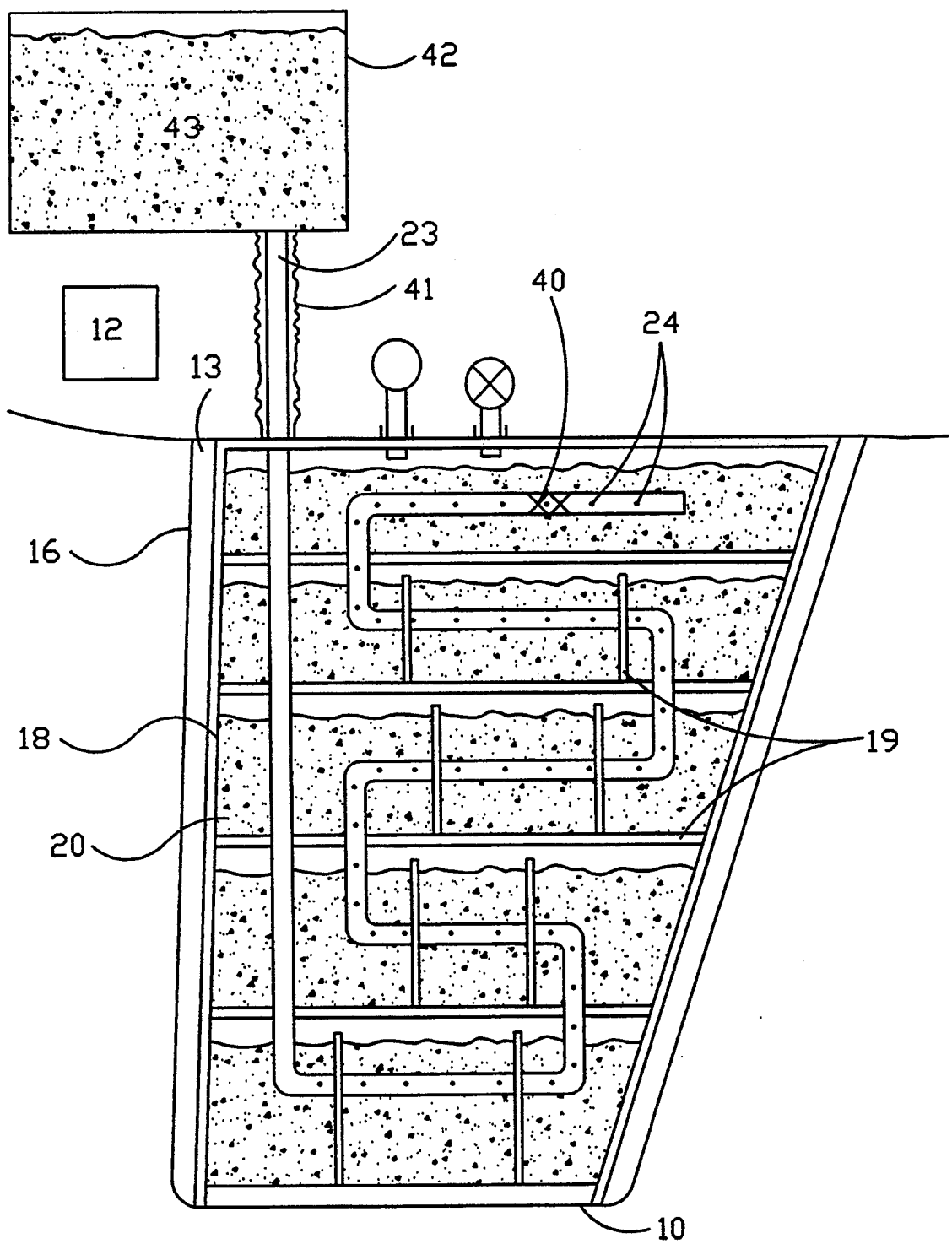

As shown in FIG. 5, a hydrogen keel 10 is connected with a hydrogen engine, fuel cell, internal combustion engine, or other heat source 12 via a cooling water pipe 13 which is used to carry a heat intermedium.

The heat intermedium passes between the outer keel shell 16 and the internal bracing 17 and circulates around the metal hydride container 18 which contains a metal hydride ballast medium 20 and a hydrogen gas atmosphere.

Although only one metal hydride container 18 is shown in FIG. 5 for clarity of expression of the processes involved, it should be understood that a plurality of metal hydride containers of other sizes and shapes may be employed to suit the keel form or heat exchange characteristics desired.

Within the metal hydride container 18, in addition to the ballast medium and hydrogen atmosphere, there are heat condcting horizontal and vertical baffles 19 which are used to conduct heat through the ballast medium 20, and secure the ballast medium 20 from shifting during sailing conditions.

A space between the ballast medium 20, and each horizontal baffle 19 is provided to allow expansion of the ballast medium during hydrogen occlusion.

A space is cutaway in each horizontal baffle 19 to allow for equalizing pressure of the hydrogen atmosphere throughout the metal hydride container 18.

A gas line 23 or plurality of gas lines are connected to the metal hydride container 18 through a gas tight fitting 22, which passes through each of the baffled compartments within the metal hydride container 18.

The gas line 23 has drilled passages 24 at various points along its length. Each drilled passage 24 is wrapped in a material filter 40 in such a manner that hydrogen can permeate the material filter 40 but the ballast medium 20 cannot. The material filter 40 is made of such a material as a sintered porous metallic body, a porous resin sheet, or a metallic mesh.

The gas line 23 is incased in an insulating material 41 from the point it exits the keel 10 and is further connected to a second or plurality of remote metal hydride containers 42 stowed at a position remote from the keel. The remote metal hydride containers 42 contain a hydrogen gas atmosphere and a second metal hydride 43, with different exothermic/endothermic properties than the ballast material 20 within metal hydride container 18.

The hydrogen keel of this embodiment of the present invention in addition to providing stability for the ship, also acts as a means to transfer heat from one area of the ship to other areas of the ship.

The operation of the hydogen keel to stabilize a ship and as the heat pump of FIG. 5, for obtaining cooling is as follows;

The mass, shape, and location of the keel act to stabilize a ship in the conventional manner.

Further, heat from a heat source such as solar or from a heat intermedium such as atmospheric air passes around remote metal hydride containers 42 either because the location of remote metal hydride containers 42 places them in contact with heated atmospheric air or a mechanical device such as a fan or pump provides the heat intermedium.

The metal hydride container 18 is in contact with a second heat intermedium such as water which is inturn in contact with the relatively cooler sea water.

The heat from the heated atmospheric air around the remote metal hydride containers 42 travels through convection to the metal hydride stored therein causing the hydrogen gas occluded to be disassociated from the metal hydride. The released hydrogen permeates the material filter 40 and passes through the gas line 23 to the metal hydride container 18 due to the difference in equalibrium dissociation pressure between the metal hydrides in the remote metal hydride containers 42 and the metal hydride container 18 in the keel. Thereby transfering heat from the remote metal hydride 43 to the ballast material 20.

The operation of the hydrogen keel as the heat pump of FIG. 5, to obtain heating is as follows;

A heat intermedium, supplied from a heat source 12 such as an internal combustion engine or other, circulates around the metal hydride container 18 within the space between the internal bracing 17 and the keel shell and through drilled passages in the internal bracing 17. Heat from the heat intermedium is transfered to the metal hydride container 18 its horizontal and vertical baffels 19, and the surrounding sea water.

The heat is then transfered through conduction to the ballast medium 20, causing it to release its occluded hydrogen. The released hydrogen permeates the material filter 40 and travels through gas line 23 to the remote metal hydride 43. Thereby transfering the heat from the ballast material 20 to the remote metal hydride 43.

As in the previous embodiments, heat intermediums may be arranged to flow internally, externally or both internally and externally. Heat sources may be radiant, convection or conduction sources. Ballast containers may oriented in any direction to better suit their spacing within the keel form or to facilitate the flow of heat intermediums. A plurality of ballast containers may be employed. Ballast containers may be arranged to react with heat intermediums alternately or in series. A pluality of metal hydride ballast mediums may be empolyed. A pluality of gas and/or heat intermedium lines may be employed, to better facilitate gas and/or heat distribution. Gas lines within the ballast container may be made from a material and/or in a manner which accomodates expansion stress such as a spring wrapped in a filter material porous to hydrogen. Ballast containers may be of any size or shape desired to achieve the desired heat or gas flow patterns or keel shape.

This embodiment of the present invention may be used in conjunction with any or all of the other embodiments.

This embodiment of the present invention provides a means of transfering heat from areas of the ship or ships systems exterior or remote from the keel without the necessity of moving parts.

The Sixth Embodiment

The hydrogen keel of the sixth embodiment of the present invention is now described hereinafter referring to FIG. 6;

The hydrogen keel of the present embodiment employs the keel as a means to stabilize the ship and as a heat pump.

Figure 6:
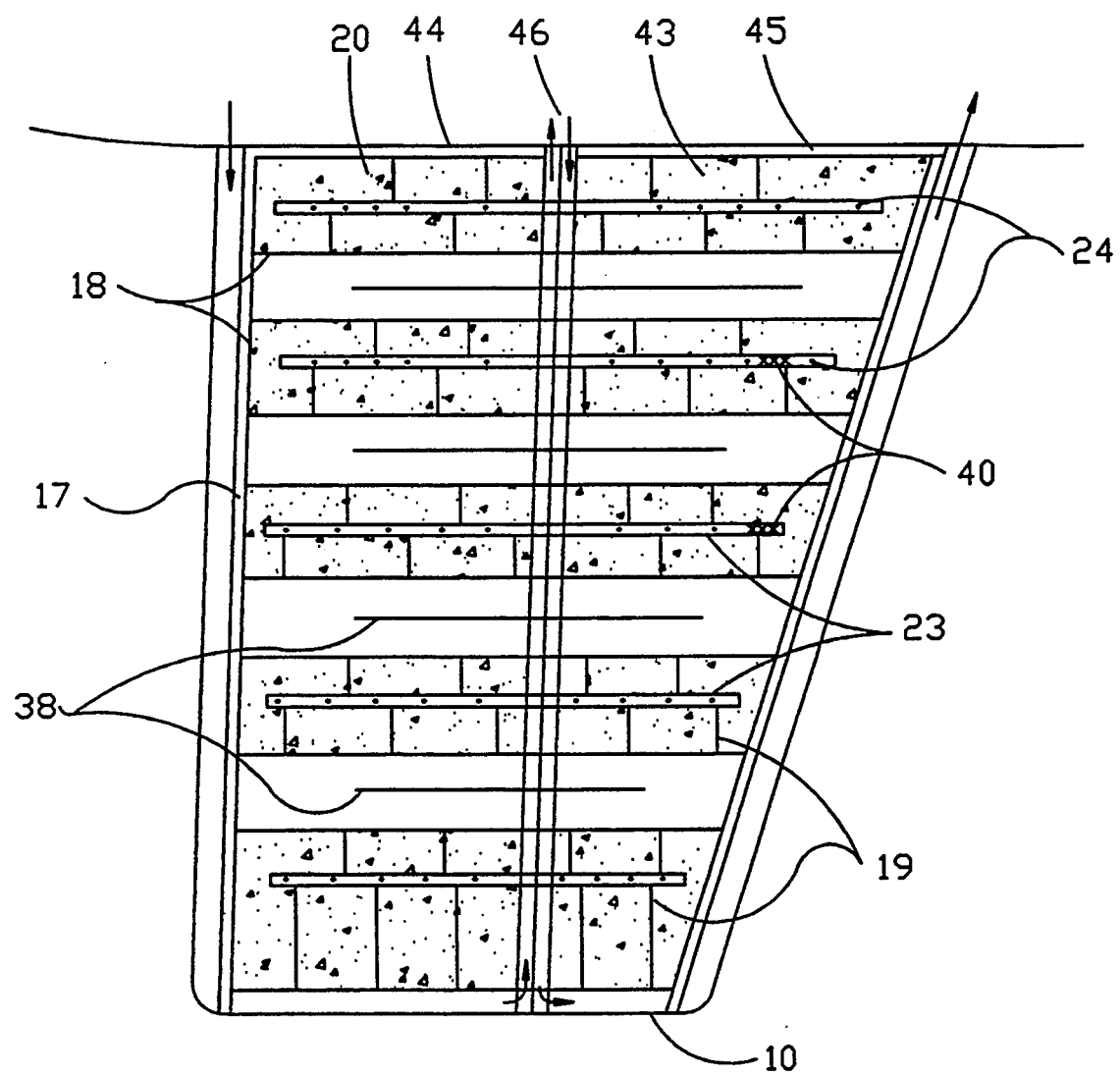

As shown in FIG. 6, a hydrogen keel 10 of the present embodiment is comprised of a plurality of ballast containers 18 and supported by internal bracing 17 which provide a means to arrange the ballast containers 18 in a manner which allows the ballast containers 18 to be exposed to at least two separate heat intermediums.

Ballast containers 18 in chamber 44 contain a metal hydride ballast medium 20. Ballast containers 18 in chamber 45 contain a second metal hydride ballast medium 43. A barrier 46 separates the heat intermediums. Ballast containers 18 in chamber 44 are connected though barrier 46 to ballast containers 18 in chamber 45 by a gas line 23.

The operation of hydrogen keel 10 to stabilize a ship and to obtain cooling is as follows;

The mass, shape, and location of the keel act to stabilize a ship in the conventional manner.

Further, assume initially ballast medium 20 is in a state of sufficiently occluding hydrogen and second ballast medium 43 is in a state of releasing hydrogen.

First a heat intermedium at a high temperature is passed through chamber 44. Thus ballast medium 20 is heated to temperature T[H] causing it to release hydrogen. The released hydrogen passes through gas line 23 to second ballast medium 43 owing to the difference in equilibrium dissociation pressure between the metal hydride ballast mediums.

The second ballast medium 43 exothermically occludes hydrogen while being maintained at a temperature T[M] (lower than T[H]).

Then the heat intermediums being supplied chamber 44 and 45 are exchanged, and a heat intermedium of medium temperature is passed into chamber 44, and a heat intermedium for cooling loads is passed into chamber 45. The heat intermedium in chamber 44 cools ballast medium 20 to temperature T[M]. As a result second ballast medium 43 endothermically releases hydrogen due to the difference in equilibrium dissociation pressure and attains a temperature T[L] (lower than T[M]), thus taking away heat from the heat intermedium.

In the meantime, hydrogen released from second ballast medium 43 is exothermically occluded by ballast material 20, which is kept at temperature T[M].

Again the heat intermediums supplied to chambers 44 and 45 are exchanged to heat ballast material 20 to temperature T[H] and second ballast material 43 to T[M] thus, a new cycle is started.

Although FIG. 6 indicates a two chamber keel with tubular shaped ballast containers with heat intermediums flowing countercurrent, other arrangements may be employed to accomplish the desired function to suit various applications. For example; a plurality of coupled chambers may be employed, heat intermedium passages may be arranged so that the heat flows downstream through a number of alternately arranged chambers in a zigzag pattern, a hydrogen compressor may be employed to facilitate heat/gas exchange, ect..

As in the previous embodiments, heat intermediums may be arranged to flow internally, externally or both internally and externally. Heat sources may radiant, convection or conduction sources. Ballast containers may be oriented in any direction to better suit their spacing within the keel form or to facilitate the flow of heat intermediums. A plurality of ballast containers may be employed. A plurality of metal hydride ballast mediums may be employed. A plurality of gas and/or heat intermedium lines may be employed, to better facilitate gas and/or heat distribution. Gas lines-within the ballast container may be made from a material and/or in a manner which accommodates expansion stress such as a spring wrapped in a filter material porous to hydrogen. Ballast containers may be of any size or shape desired to achieve the desired heat or gas flow patterns or keel shape.

This embodiment of the present invention may be used in conjunction with any or all of the other embodiments.

The present embodiment allows the hydrogen keel to act to stabilize the ship and also acts as a heat pump. A further advantage is that it eliminates any need for hydrogen gas to leave the keel compartment to provide the heat pump with heat.

The Seventh Embodiment

The hydrogen keel fo the seventh embodiment of the present invention is now described hereinafter referring to FIG. 7;

The hydrogen keel of the present embodiment employs the keel as a means to stabilize a ship and as a heat storage unit.

Figure 7:
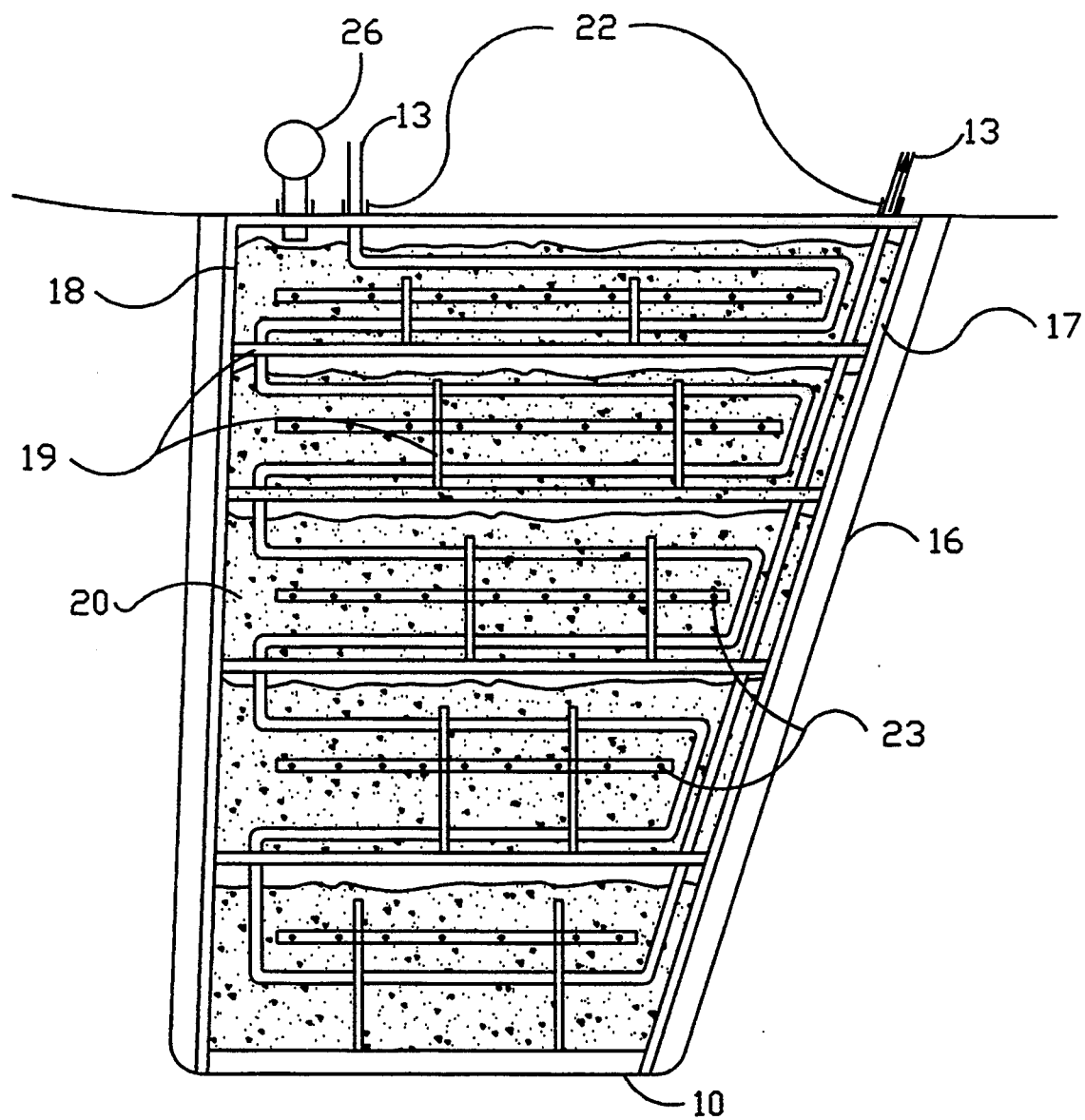

As shown in FIG. 7, a hydrogen keel 10 of the present embodiment is comprised of a ballast container 18 with internal baffles 19 and containing a metal hydride ballast medium 20 and a hydrogen atmosphere in a manner which provides a space between the ballast material 20 and the top of the ballast container. Said ballast container is supported by internal bracing 17 and the keel shell 16, in a manner which provides an air space between ballast container 18 and keel shell 16.

A heat intermedium passes through water line 13 and may be employed to supply the keel with heat or to withdraw heat from the keel.

A gas line 23 passes through all of the baffled compartments within the ballast container 18 and facilitates the movement of hydrogen gas throughout the ballast medium.

A pressure relief valve 26 is provided to prevent over pressuring the ballast container.

The operation of the keel to stabilize a ship and as a heat storage unit is as follows;

The mass, shape, and location of the keel act to stabilize a ship in the conventional manner.

In addition a heat intermedium of high temperature T[H] supplied from a heat source is passed through water line 13 which is connected to the ballast container 18 by a gas tight fitting 22 and transfers its heat to the mass of ballast medium 20 through conduction, and exits the ballast container through water line 13 which exits the keel 10 through gas tight fitting 22. Thus causing the heat transferred to be stored within the ballast medium 20 and occluded hydrogen to be released from the ballast medium 20.

When the flow of heat from the heat intermedium is stopped, heat losses from the ballast container are countered by the heat generated by the exothermal occlusion of hydrogen by the cooling ballast medium 20. Thus tending to maintain the temperature within the ballast container.

When heat is to be withdrawn, a heat intermedium with a temperature lower than T[H] i.e. T[L] enters through water line 13 passes through the ballast compartments and absorbs stored heat from the ballast medium 20 and exits from the keel.

As in the previous embodiments, heat intermediums may be arranged to flow internally, externally or both internally and externally. Heat sources may radiant, convection or conduction sources. Ballast containers may be oriented in any direction to better suit their spacing within the keel form or to facilitate the flow of heat intermediums. A plurality of ballast containers may be employed. A plurality of metal hydride ballast mediums may be employed. A plurality of gas and/or heat intermedium lines may be employed, to better facilitate gas and/or heat distribution. Gas lines within the ballast container may be made from a material and/or in a manner which accommodates expansion stress such as a spring wrapped in a filter material porous to hydrogen.

Ballast containers may be of any size or shape desired to achieve the desired heat or gas flow patterns or keel shape.

The present embodiment provides a means for the keel to function to stabilize the ship and to function as a heat storage unit and may be used in conjunction with any or all of the previous embodiments.

The Eighth Embodiment

The hydrogen keel of the eighth embodiment of the present invention is now described hereinafter referring to FIG. 8;

The hydrogen keel of the present embodiment employs the keel as a means to stabilize the ship and as a hydrogen gas compressor.

As shown in FIG. 8, a hydrogen keel 10 of the present embodiment is comprised of a ballast containers 18 with internal baffles 19. The ballast containers 18 are supported by internal bracing 17 in a manner which provides passages to facilitate the flow of heat intermediums. (A plurality of ballast containers may be employed.)

A gas inlet line 23 with in line one way valve 47 is attached to ballast container 18 through gas tight fitting 22. Gas line 23 passes through each of the baffled compartments within the ballast containers 18. Gas line 23 distributes low pressure hydrogen gas and receives high pressure hydrogen gas through drilled passages 24 which are wrapped in a filter medium 40 porous to hydrogen but not the ballast medium 20.

The operation of the hydrogen keel to stabilize a ship and as a gas compressor is as follows;

The mass, shape, and location of the keel act to stabilize a ship in the conventional manner.

Low pressure hydrogen gas is supplied, from a source such as an electrolyzer, storage tank or other, to gas line 23. Said gas passes through valve 47 to ballast medium 20 which has been cooled by a heat intermedium at temperature T[L] flowing external to ballast container 18. Thereby causing ballast medium 20 to occlude hydrogen. Valve 47 is then closed. The flow of the heat intermedium at temperature T[L] is stopped.

A heat intermedium at temperature T[H] (higher than T[L]) is induced to flow external to the ballast container 18 causing hydrogen to be released from the ballast medium 20 and increasing the pressure within ballast container 18.

At a predetermined pressure, for example 100 psi., one way divertor valve 48 opens, allowing compressed hydrogen gas to exit the keel.

When the pressure in ballast container 18 drops below a predetermined pressure valve 48 closes, and valve 47 opens allowing another cycle to begin. If two or more ballast containers employed, and heat intermedium flows are alternated the flow of gas may be continuous.

Pressures in excess of 500 psi. have been generated by the present embodiment. It can be readily seen that if the pressure of the compressed hydrogen gas were to be exchanged with other less volatile gases through a conventional pressure exchange mechanism, those other gases might be employed by the ships contol systems, refrigeration systems, and other systems wich require compressed gases for their operation.

As in the previous embodiments, heat intermediums may be arranged to flow internally, externally or both internally and externally. Heat sources may radiant, convection or conduction sources. Ball, ast containers are oriented in any direction to better suit their spacing within the keel form or to facilitate the flow of heat intermediums. A plurality of ballast containers may be employed. A plurality of metal hydride ballast mediums may be empolyed. A plurality of gas and/or heat intermedium lines may be employed, to better facilitate gas and/or heat distribution. Gas lines within the ballast container may be made from a material and/or in a manner which accommodates expansion stress such as a spring wrapped in a filter material porous to hydrogen. Ballast containers may be of any size or shape desired to achieve the desired heat or gas flow patterns or keel shape.

The present embodiment provides a means for the keel to function to stabilize the ship and to function as a hydrogen compressor unit. It may be used in conjunction with any or all of the previous embodiments.

The Ninth Embodiment

The hydrogen keel of the ninth embodiment of the present invention is described hereinafter in details referring to FIG. 9;

The present embodiment is an example of one of many possible configurations which combine, in one keel form, all of the functions of ship stability, fuel storage, hydrogen compression, heat storage, heat exchange, and heat pumping described in the previous eight embodiments.

Figure 9A:
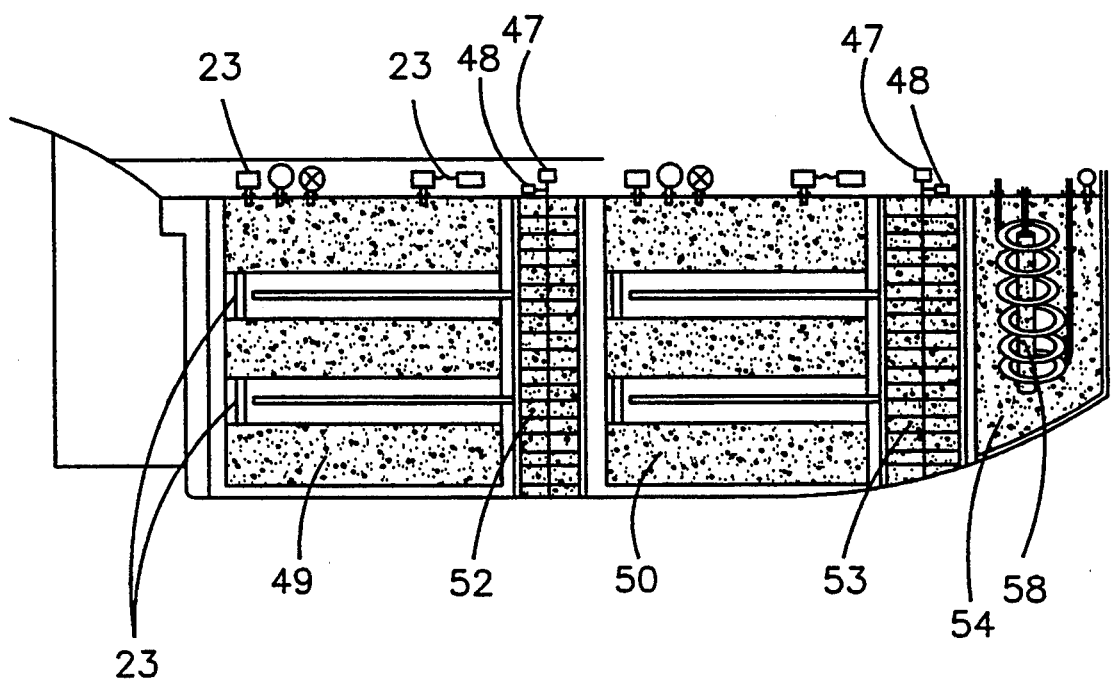
Figure 10:
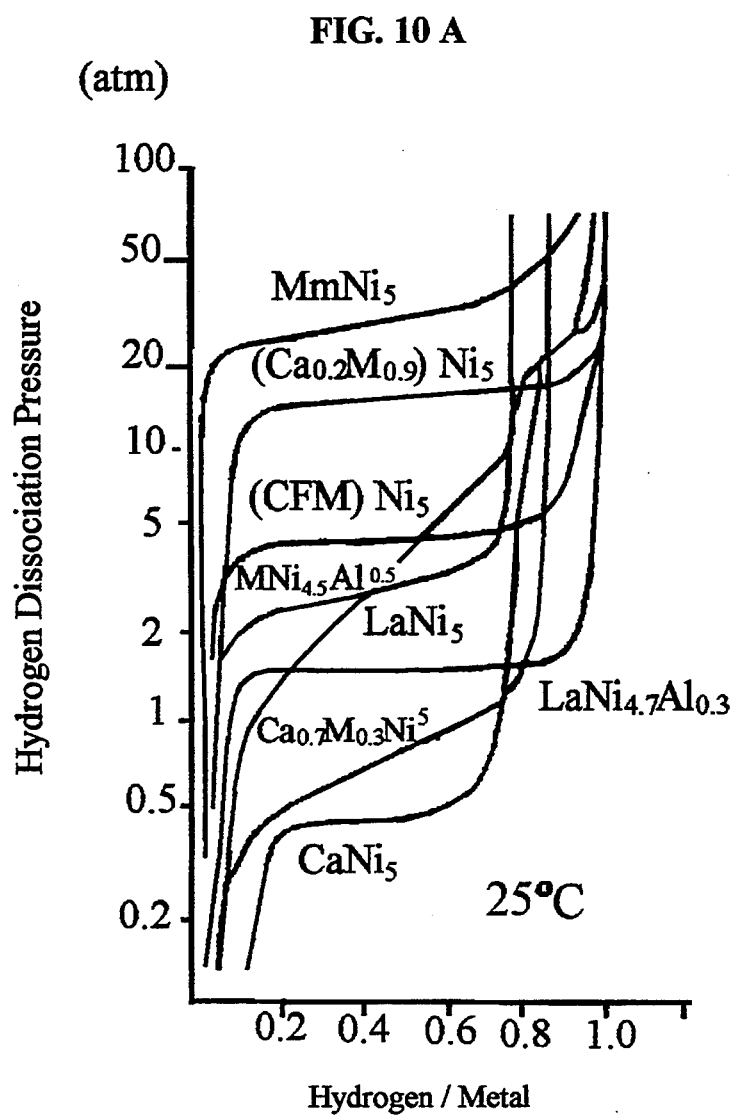
FIGS. 10A, 10B and 10C are comparative diagram of the various pressure-hydrogen content isotherms of a number of metal hydrides, FIG. 11; is a table of various hydride ballast mediums volume to weight ratios, and hydrogen storage capacities.
Figure 10:
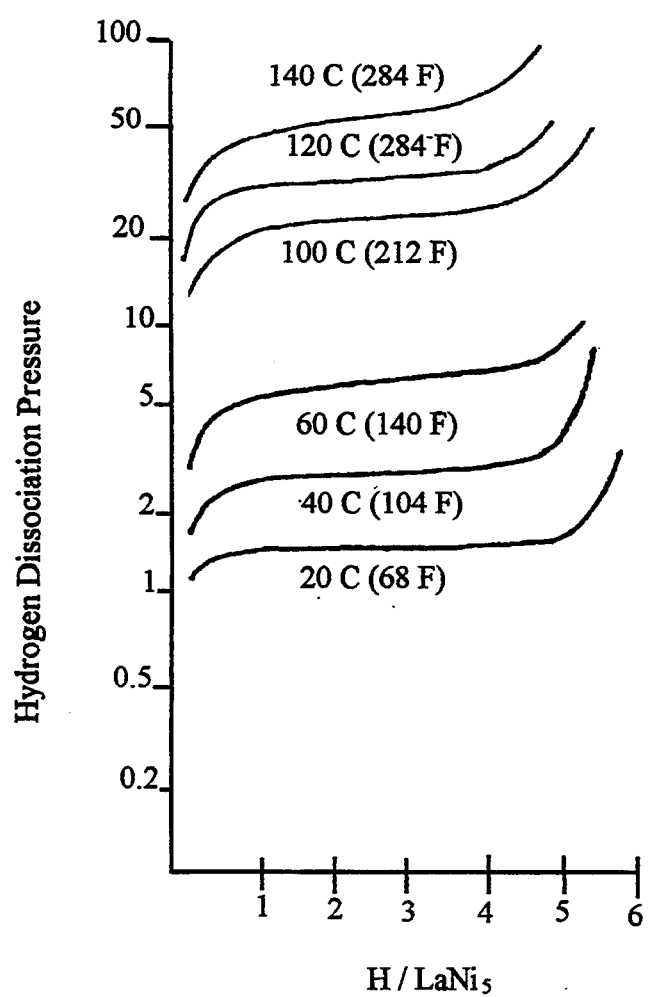

As shown in FIG. 9, the hydrogen keel of the present embodiment is supplied from various heat sources, and heat intermediums. Low pressure hydrogen is supplied by water electrolysis, and is employed for various purposes.

Construction details are as follows;

Keel shell 16 is manufactured from steel plate.

Fuel containers 49 and 50, heat storage tank 54 and internal baffles are manufactured from copper plate.

Low pressure compressors 52 and 53 and heat pump 58 containers are manufactured from copper pipe with end caps.

All ballast containers are supported by, and secured within, cutaway spaces of internal braces 17 which are manufactured from stainless steel.

Directional baffles are manufactured from stainless steel.

Gas lines and heat intermedium lines are manufactured from copper tubing, and connected to their various sources or destinations in manners described in the details of preceding embodiments.

Heat intermedium passages, and space allowances for ballast containers and ballast medium expansion, are arranged in manners described in the details of the preceding embodiments.

Assume that fuel container 49, and both compressor 52 and 53 are in a state of occluding hydrogen. Further, fuel container 50, is in a state of hydrogen saturation.

A conventional water electrolyzer 51 supplies low pressure hydrogen gas to low pressure compressors 52 and 53. Compressors 52 and 53 are supplied with heat intermediums from heat storage unit 54 through pump 56 and fuel container 49 through cooling water pump 55.

A remote metal hydride solar collector 42, connected to heat pump 58, operates as a heat pump based on the principles described in the fifth embodiment of the present invention, and provides heat for the heat storage unit 54, which operates on the principles described in the seventh embodiment of the present invention.

The operation of these components of the hydrogen keel are as follows;

The mass, shape, and location of the keel act to stabilize a ship in the conventional manner.

Hydrogen gas from electolyzer 51 is supplied at low pressure to compressor 52 through fuel line 23 and one way valve 47. Simultaneously a heat intermedium at temperature T[L] is transferred through pump 55 from the heat intermedium passages surrounding fuel container 49 to the heat intermedium passages surrounding compressor 52 causing the metal hydride ballast medium 20, within compressor 52 to occlude the supplied hydrogen.

After a predetermined time period the flow of hydrogen from electolyzer 51 is diverted to compressor 53.

The flow of heat intermedium at temperature T[L] from fuel container 49 is simultaneously diverted to the passages surrounding compressor 53.

A heat intermedium at temperature T[H] (higher than T[L]) is transferred from heat storage unit 54 through pump 56 to the passages-surrounding compressor 52, causing the occluded hydrogen in ballast medium 20 to be released, and pressurized. Upon reaching a predetermined pressure the compressed hydrogen in 52 is transferred to accumulator tank 57. The pressurized hydrogen in accumulator tank 57 may be discharged to hydrogen engine 12 to facilitate engine start or to fuel tank 49 where it is occluded and stored by the metal hydride ballast medium 20 within fuel container 49.

When the pressure within compressor 52 drops to a predetermined point the flow of hydrogen from 52 is stopped. Heat intermedium at temperature T[H] from 54 is diverted to 53, which causes the occluded hydrogen of metal hydride ballast medium 20 of compressor 53 to be released and compressed.

Hydrogen from electolyzer 51, and heat intermedium at temperature T[L] are again transferred to the passages surrounding compressor 52. Thus starting a new cycle.

Hydrogen engine 12 is supplied with compressed hydrogen gas from accumulator tank 57 for initial start.

When its cooling water reaches a predetermined temperature (engine cooling water system or an exhaust gas heat exchanger may be employed) it supplies a heat intermedium to the passages surrounding fuel container 50 at temperature T[H] in a manner described in the preceding embodiments causing the ballast medium 20 of fuel container 50 to release its stored hydrogen.

When the flow of hydrogen from fuel container 50 to the hydrogen engine 12 reaches a predetermined rate, the flow of compressed hydrogen from the accumulator tank 57 is discontinued.

The compressed hydrogen within accumulator tank 57 may be used to supplement the fuel supplied to the hydrogen engine 12 during engine load shifts.

The location of the various functioning components of the keel are arranged to equally distribute the ballast weight throughout the keel form, and may be arranged in any manner which best suits the individual application.

Further, as in the previous embodiments, heat intermediums may be arranged to flow internally, externally or both internally and externally. Heat sources may radiant, convection or conduction sources. Ballast containers may be oriented in any direction to better suit their spacing within the keel form or to facilitate the flow of heat intermediums. A plurality of ballast containers may be employed.

A plurality of metal hydride ballast mediums may be employed. A plurality of gas and/or heat intermedium lines may be employed, to better facilitate gas and/or heat distribution. Gas lines within the ballast container may be made from a material and/or in a manner which accommodates expansion stress such as a spring wrapped in a filter material porous to hydrogen. Ballast containers may be of any size or shape desired to achieve the desired heat or gas flow patterns or keel shape.

SUMMARY OF THE INVENTION

Accordingly, the reader will see that the hydrogen, hydride, keel of the present invention can be employed to stabilize semi-displacement and full displacement ships of all type.

In addition its composition and configuration provide a means for it to function as an integral part of many ships systems.

Through the use of the endothermal/exothermal, absorption/desorption properties of various metal alloys in relation to hydrogen gas, and an arrangement of heat flow patterns within the keel, the keel functions to;
Store hydrogen fuel
Compress hydrogen gas
Provide heat exchange
Transfer heat
Pump heat
Store Heat All of these functions are achieved without any moving parts, in a safe, non-polluting and reliable manner.

Although the descriptions above contain many specificities, these should not be construed as limiting the scope of the invention but merely providing illustrations of some of the presently preferred embodiments of this invention. For example, a ballast material such as lead, steel, or other weighty material may be employed in addition to the metal hydride ballast material within a keel form to increase the weight of the keel; the metal hydride ballast may be suspended in a matrix material such as porous aluminium, natural rubber, ect.. It is to be understood that modifications and variations may be resorted to without departing from the spirt and scope of the invention, as those skilled in the art will readily understand.

Thus the scope of the invention should be determined by the appended claims and their legal equivalents, rather than the examples given.

I claim:
1. A ballast container, comprising:
 a. a hydrogen occluding ballast medium;
 b. means for directing heat flow through said ballast medium;
 c. means for distributing hydrogen gas throughout said ballast medium;
 d. means for controlling the rate of absorption and release of said hydrogen gas by said ballast medium; and
 e. means for regulating the temperature of said ballast medium.

2. The ballast container of claim 1 wherein said ballast container is in the form of a keel.

3. The ballast container of claim 1 wherein said ballast container is in the form of a skeg.

4. A ballast container comprising:
 a. an outer surface and a plurality of internal surfaces defining an internal space;

b. internal braces interconnecting said internal surfaces within said internal space, said internal braces being made from a material resistant to expansion stress; and c. a metal hydride container containing a metal hydride, arranged within said ballast container to place said metal hydride in contact with a heat intermedium.

5. The ballast container of claim 4 wherein said ballast container is in the form of a keel.

6. The ballast container of claim 4 wherein said ballast container is in the form of a skeg.

7. A ballast container comprising:

a. an outer surface and a plurality of internal surfaces defining an internal space;

b. internal braces interconnecting said internal surfaces within said internal space, said internal braces being made from a material resistant to expansion stress; and d. a plurality of metal hydride containers containing metal hydrides, arranged within said ballast container to place said metal hydrides in contact with a plurality of heat intermediums.

8. The ballast container of claim 7 wherein said ballast container is in the form of a keel.

9. The ballast container of claim 7 wherein said ballast container is in the form of a skeg.

10. The ballast container of claim 7 providing a means to stabilize a ship.

11. The ballast container of claim 7 providing a means to stabilize a ship and store hydrogen in a metal hydride.

12. The ballast container of claim 7 providing a means to stabilize a ship and compress hydrogen gas.

13. The ballast container of claim 7 providing a means to stabilize a ship and providing a means by which heat is stored.

14. The ballast container of claim 7 providing a means to stabilize a ship and providing a means of heat exchange for said ships systems.

15. The ballast container of claim 7 providing a means to stabilize a ship and providing a means to pump heat.

16. The ballast container of claim 7 providing a means to stabilize a ship, and providing a means to store and release hydrogen fuel, compress hydrogen gas, exchange heat, transfer heat, store heat, and pump heat.

17. A ship fitted with the ballast container of claims 1, 4, or 7.

* * * * *